United States Patent [19]

Sayer et al.

[11] Patent Number: 5,560,686
[45] Date of Patent: Oct. 1, 1996

[54] LATERALLY MOVABLE WHEEL RIM

[75] Inventors: John Sayer, Bridgnorth; Terence R. Crowe, Shrewsbury, both of England

[73] Assignee: GKN Sankey Limited, Telford, United Kingdom

[21] Appl. No.: 377,255

[22] Filed: Jan. 24, 1995

[30] Foreign Application Priority Data

Jan. 25, 1994 [GB] United Kingdom ............... 9401314

[51] Int. Cl.⁶ ........................................ B60B 23/00
[52] U.S. Cl. ..................... 301/9.2; 301/11.3; 301/35.62
[58] Field of Search ........................... 301/9.1, 9.2, 10.1, 301/11.1, 11.3, 35.62

[56] References Cited

U.S. PATENT DOCUMENTS

| 2,384,649 | 9/1945 | Sinclair | 301/11.1 |
|---|---|---|---|
| 3,788,705 | 1/1974 | Brainard et al. | 301/35.62 |
| 4,883,324 | 11/1989 | Fuchs et al. | 301/9.2 |
| 5,067,776 | 11/1991 | Aderer | 301/9.2 |

FOREIGN PATENT DOCUMENTS

| 0405100 | 5/1990 | European Pat. Off. |
|---|---|---|
| 2686549 | 7/1993 | France . |
| 626840 | 7/1949 | United Kingdom . |
| 2058686 | 4/1981 | United Kingdom . |
| 2167717 | 6/1986 | United Kingdom . |
| 2168014 | 6/1986 | United Kingdom . |
| 2263449 | 7/1993 | United Kingdom . |

*Primary Examiner*—Russell D. Stormer
*Attorney, Agent, or Firm*—Marshall, O'Toole, Gerstein, Murray & Borun

[57] ABSTRACT

A manually adjustable wheel for a vehicle e.g. an agricultural tractor comprises a rim to receive a tire, the rim having at least one cylindrical portion; a plurality of channel-shaped lugs spaced apart around the radially inner surface of the cylindrical portion of the rim, the channel in each lug extending perpendicular to the rotary axis of the wheel and receiving a pair of circumferentially spaced apart bolts extending transversely across the channel and through the walls thereof, each lug having flanges extending circumferentially of the wheel rim and being attached by welding to the radially inner surface of the cylindrical portion of the rim; and a wheel disc for connection to a hub of the vehicle, the disc having substantially the shape of a square with the corners removed to provide an irregular generally octagonal shape having four longer sides and four shorter sides arranged alternately around the periphery of the octagon each shorter side being juxtaposed against a lug, the disc and lugs being arranged so that the disc may be selectively secured to the lugs by the bolts in either of two positions, the bolts being located along the shorter sides of the disc only and, at each of the shorter sides comprising the pair of bolts each passing through the disc and through a lug juxtaposed to the shorter side.

2 Claims, 2 Drawing Sheets

5,560,686

LATERALLY MOVABLE WHEEL RIM

BACKGROUND OF THE INVENTION

This invention relates to a manually adjustable wheel of the type frequently utilised on agricultural tractors.

It is known to provide agricultural tractors with manually adjustable wheels whereby the track i.e. the spacing between a pair of coaxial wheels of the tractor may be adjusted to suit its use in differing agricultural situations where for example differing widths of rows of crops have to be traversed by the tractor. Such known manually adjustable wheels usually comprise a rim detachably secured to a disc which is itself detachably secured in conventional manner to a rotary member such as a driveshaft. The means for detachably securing the rim to the disc usually comprises a plurality of lugs spaced apart circumferentially around the radially inner surface of the rim.

DESCRIPTION OF THE PRIOR ART

British patent specification GB-A-2 058 686 discloses differing embodiments of manually adjustable wheels for agricultural tractors wherein the wheel disc is formed from a square blank to a generally octagonal shape having four longer sides which alternate around the periphery of the disc with four shorter sides. Each of the shorter sides of the disc is secured by a pair of circumferentially spaced apart lugs to the wheel rim, the lugs themselves being welded to the radially inner surface of the rim. In one of the embodiments disclosed in this specification the lugs are all of generally top hat section providing a bolt-receiving channel extending axially of the rim with circumferentially extending feet of each lug being welded to the radially inner surface of the rim. A further embodiment disclosed in this specification discloses all of the lugs again being of generally top hat section but being welded to the radially inner surface of the rim so that the channel of each lug extends perpendicular to the rotary axis of the wheel. The disc is secured to each lug by means of a bolt extending through the opposed side walls of the lug. Although not specifically disclosed in GB-A-2 058 686, it is known to strengthen the lugs by providing a strut such as in the form of a robe extending between the opposed inner surfaces of the side walls of each lug whereby when the bolt is tightened to secure the disc to the rim the struts are placed in compression.

It is also known to provide a manually adjustable tractor wheel wherein a disc of the same general configuration referred to above has each of its shorter sides secured to the rim by means of a single lug providing two bolted connections therethrough to a said shorter side of the disc. In this construction each of the lugs is of generally top hat form providing a channel section which extends generally perpendicular to the rotary axis of the wheel. Each of the lugs has axially outwardly extending feet whereby the axially outer edges of such feet are securable to the wheel rim by fillet welding to the radially inner surface thereof. In this construction each lug is reinforced against axial compressive forces by providing the wheel rim with a special mating profile comprising a cylindrical portion displaced radially inwardly of the rim well. Said radially inwardly displaced portion is formed with an axial dimension so as to enable it to fit snugly within the axial confines of each lug. Thus axial compressive forces imparted to the lug when the disc is secured thereto by bolting are resisted by said radially inwardly displaced part of the wheel rim acting as a strut.

SUMMARY OF THE INVENTION

It is an object of the present invention to provide a new and improved construction of manually adjustable wheel such as for an agricultural tractor.

In accordance with the invention there is provided a manually adjustable wheel for a vehicle e.g. an agricultural tractor comprising a rim to receive a tire, the rim having at least one cylindrical portion; a plurality of channel-shaped lugs spaced apart around the radially inner surface of a said cylindrical portion of the rim, the channel in each lug extending perpendicular to the rotary axis of the wheel and receiving a pair of circumferentially spaced apart bolts extending transversely across said channel and through the walls thereof, each lug having flanges extending circumferentially of the wheel rim and being attached by welding to said radially inner surface of a said cylindrical portion of the rim; and a wheel disc for connection to a hub of the vehicle, the disc having substantially the shape of a square with the corners removed to provide an irregular generally octagonal shape having four longer sides and four shorter sides arranged alternately around the periphery of the octagon each shorter side being juxtaposed against a said lug, the disc and lugs being arranged so that the disc may be selectively secured to the lugs by said bolts in either of two positions, the bolts being located along the shorter sides of the disc only and, at each of said shorter sides comprising said pair of bolts each passing through the disc and through a said lug juxtaposed to said shorter side.

Preferably the walls of each said lug are provided with axially outwardly extending bosses whereby when a said lug is juxtaposed to a said shorter side of the disc the said bosses are in contact with said disc and a space is defined between the disc and the remainder of the wall of the lug.

BRIEF DESCRIPTION OF THE DRAWINGS

Other features of the invention will become apparent from the following description given herein solely by way of example with reference to the accompanying drawings wherein.

DESCRIPTION OF THE PREFERRED EMBODIMENT

Figure 1:
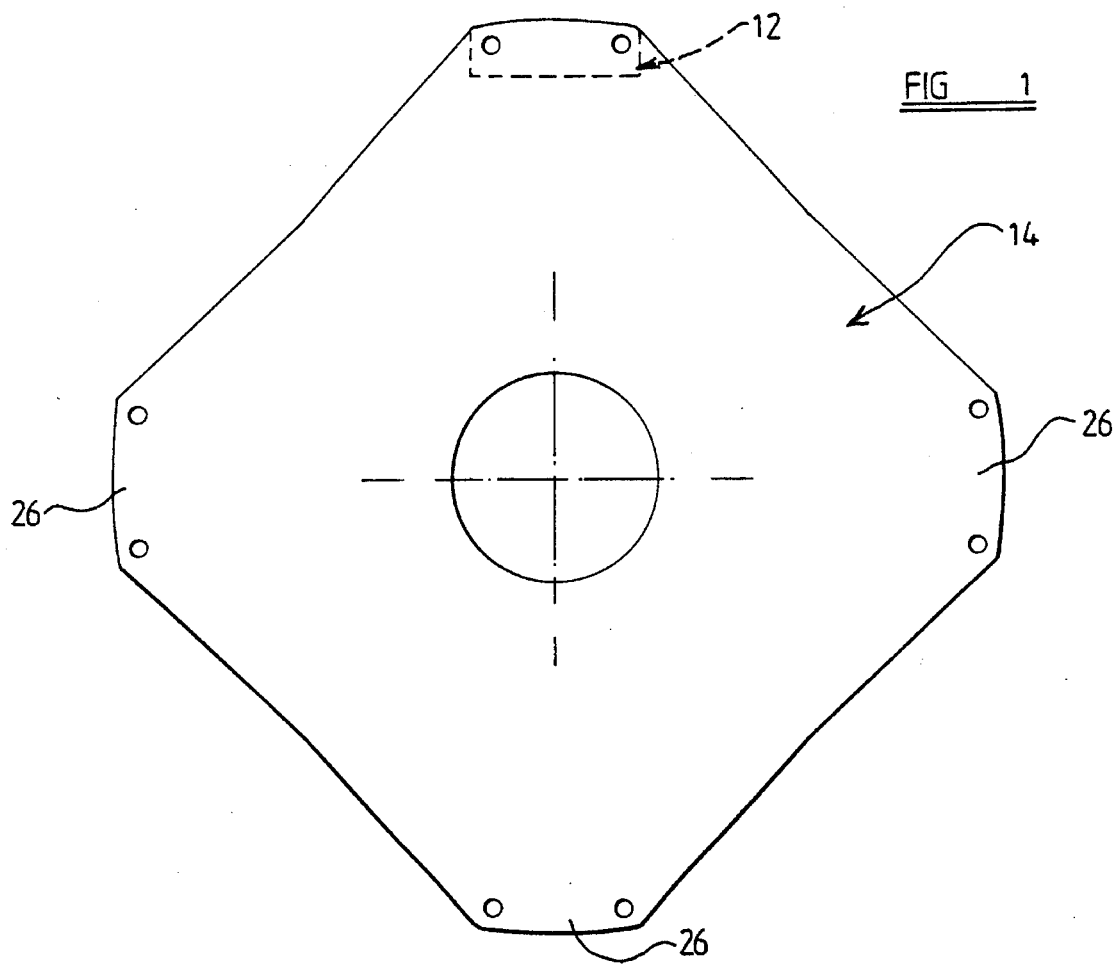
FIG. 1 is a side elevation of a generally octagonal wheel disc forming part of the wheel of the invention.
Figure 2:
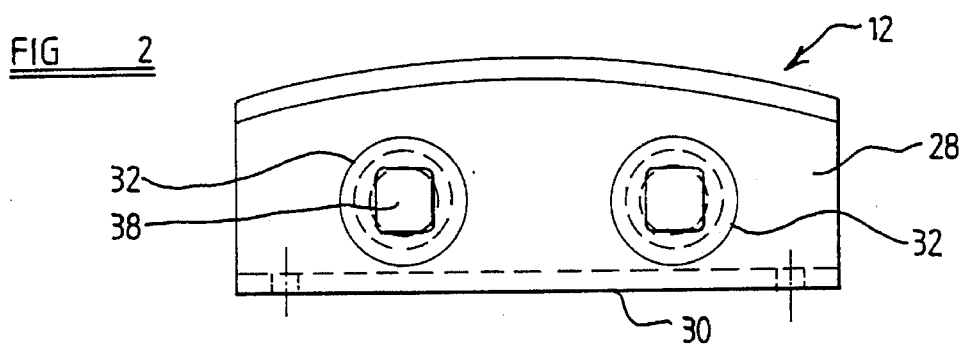
FIG. 2 is a side elevation of one of the lugs for welding to the wheel rim.
Figure 3:
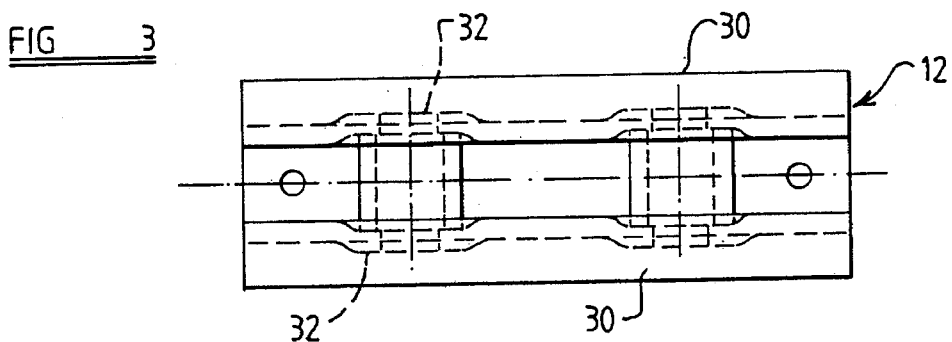
FIG. 3 is a plan view of the lug shown in FIG. 2.
Figure 4:
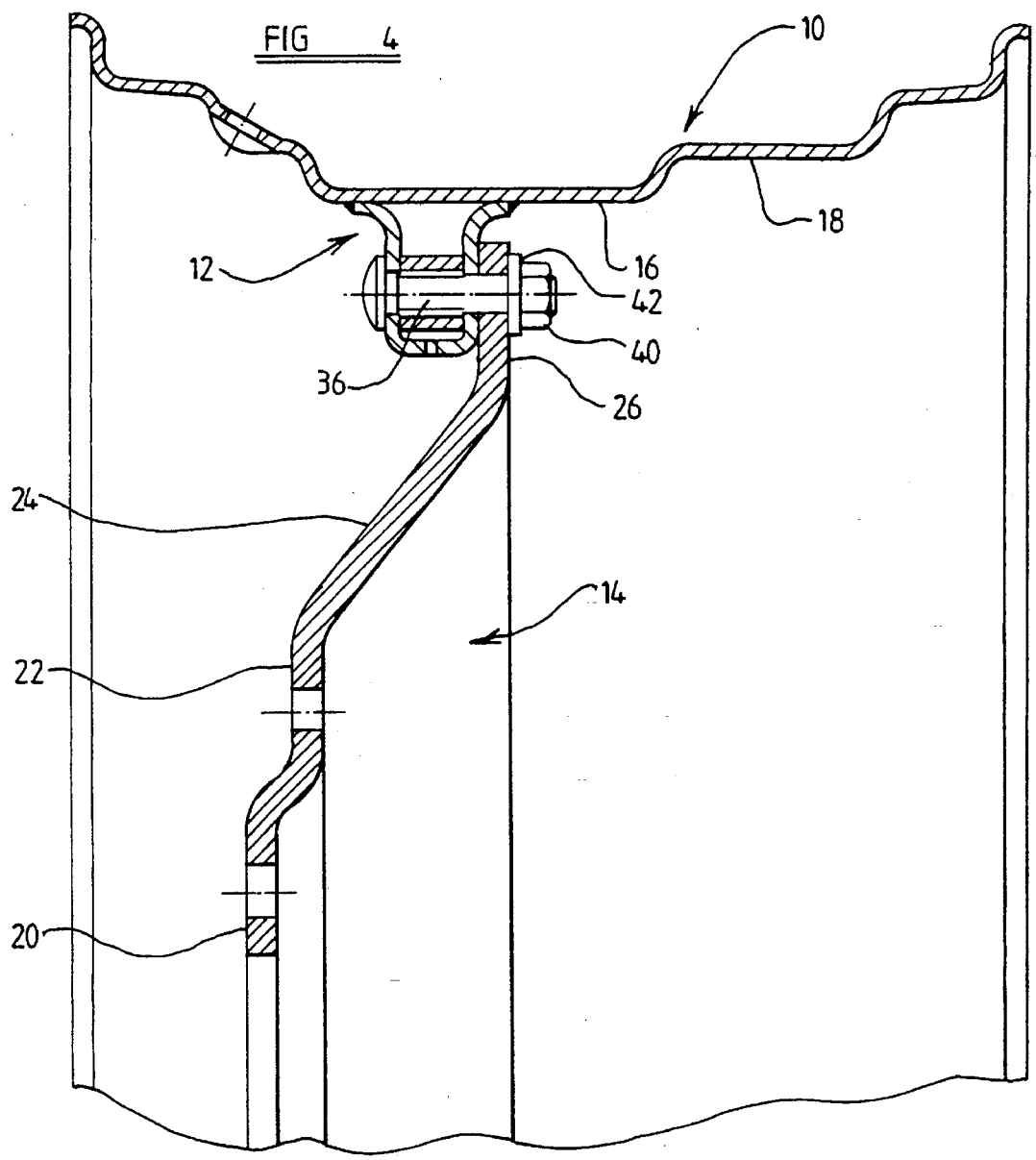
FIG. 4 is a radial cross-sectional view through a wheel in accordance with the invention showing a part of the wheel disc secured by bolting to a lug with the lug being welded to the radially inner surface of a rim well.
Figure 5:
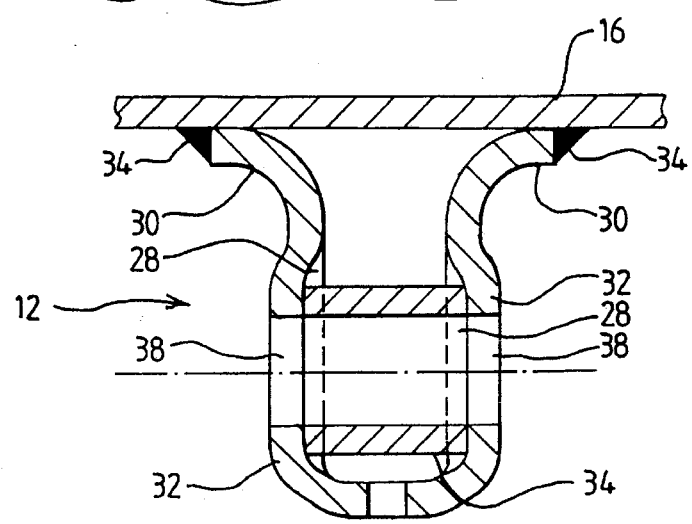
FIG. 5 is a detailed cross-sectional view of one of the lugs.

As illustrated in the drawings a wheel in accordance with the invention comprises a wheel rim 10 having four circumferentially spaced apart lugs 12 secured to the radially inner surface thereof, each of the lugs being secured to a wheel disc 14 by means of two bolts extending axially through each lug.

The wheel rim 10 may be of generally conventional construction comprising either a single well configuration or, as illustrated, a double well configuration wherein two cylindrical portions 16 and 18 of the wheel rim are provided radially displaced from one another.

The disc 14 has a central planar portion or nave 20 securable in known manner by bolting to a driveshaft of a tractor. Radially outwardly of the nave 20 there is provided a further planar portion 22 perpendicular to the rotary axis of the wheel but axially displaced therefrom. Radially outwardly of this portion 22 there is a conical portion 24 and radially outwardly of that there is a rim portion 26 perpendicular to the rotary axis of the wheel. Each of such rim portions provides a shorter side of the generally octagonal disc 14.

Each of the lugs 12 is of generally channel-shaped top hat cross-section having generally parallel opposed planar side walls 28 extending circumferentially of the rim and having axially outwardly directed feet 30 securable to one of the cylindrical well portions 16 or 18 of the rim. As illustrated, each of the opposed side walls 28 of each lug is formed with an axially outwardly displaced boss portion 32 surmounted by a circumferential seating plateau. Internally of each lug there is provided a strut typically in the form of a tube 34 which is locatable within the lug during formation thereof by means of opposed recesses provided by the axially outwardly displaced boss portions 32.

Each lug 12 is secured to a said well portion 16 of the wheel rim as illustrated by circumferentially extending fillet welding 34 along the axially outer edges of the lug feet 30. If desired, fillet welding may also be provided to extend axially around the corner of each end of each lug foot 30.

Each shorter side 26 of the wheel disc is secured to a respective lug by bolts 36 which have squared portions on their shanks to engage in square section holes 38 in the walls 28 of a said lug, each bolt having a threaded portion to receive a nut 40 and washer 42. In generally known manner, variation in track of a vehicle having wheels constructed in accordance with the invention is obtained either by reversing the disc and/or by arranging the disc to be secured at one side or the other of the lugs. When the disc is secured to the lugs by the bolts the planar rim portion of the disc comprising a short side 26 thereof abuts tightly against the axially extending bosses 32 on the respective side wall 28 of each lug thereby affording a small axial clearance between the remainder of the side wall and the adjacent surface of the disc rim portion 26. This axial clearance permits ingress of paint during the painting operation whereby the assembled disc and rim may be painted as a unit rather than having to paint them separately and then assemble them after having been painted.

The lugs of a wheel constructed in accordance with the invention, together with their internal struts 34, are sufficiently strong to accommodate the compressive forces imparted thereto when the wheel disc is bolted to the lugs. Thus there is no need to provide a special rim section to reinforce the lug. Hence, during manufacture, the lugs may be welded to the wheel rim at either of the two cylindrical rim portions 16 or 18 of a double well rim.

It is found also that the attachment of the disc to each lug by two bolts, together with the fact that each lug is fillet welded to the rim in a circumferential direction, minimises the problems of air leakage which can be occasioned in known wheels by fatigue crack propagation from the weld sites. Thus a wheel constructed in accordance with the invention may be utilised with both tubed and tubeless tyres.

We claim:

1. A manually adjustable wheel for a vehicle comprising a rim to receive a tire, the rim having at least one cylindrical portion;

three or more channel-shaped lugs spaced apart around the radially inner surface of said cylindrical portion of the rim, each of said lugs having a pair of parallel walls extending radially inwardly and generally perpendicular to the rotary axis of the wheel, the lugs each being adapted to receive a pair of circumferentially spaced apart bolts extending transversely across the lug and through openings in the walls thereof; and a wheel disc adapted for connection to a hub of the vehicle, the disc having substantially the shape of a square with the corners removed to provide an irregular, generally octagonal shape having four longer sides and four shorter sides arranged alternately around the periphery of the octagonal disc, each shorter side being juxtaposed against one of said lugs, the disc and lugs being arranged so that the disc may be selectively reversibly secured to the lugs by said bolts in either of two positions, the bolts being located along the shorter sides of the disc only and, at each of said shorter sides each of said pair of bolts passing through an opening in the disc and through openings in the parallel walls of a lug juxtaposed to said shorter side, at least one likefacing wall of each said lug having a boss around each wall opening extending outwardly a predetermined distance to define a seating plateau, said seating plateaus on said lugs collectively defining an unobstructed plane which mates with coplanar surfaces on said plurality of shorter sides of said disk, said predetermined distance being selected such that when said disk and said lugs are joined, the resulting offset of said disk from the walls of said lugs is effective to provide access to paint therebetween and thereby to permit assembly of said disk and said rim prior to factory application of paint.

2. A wheel according to claim 1, wherein said shorter sides of the disk each have surfaces on opposed sides adapted to mate with coplanar seating plateaus on said lugs, and wherein each of the parallel walls of said lugs have extending therefrom like bosses respectively defining seating plateaus, whereby said disk may be mated, offset from said lug walls by said predetermined distance, on coplanar seating plateaus on either of said parallel walls of said lugs.

* * * * *